＃US009289868B2

(12) United States Patent
Gray et al.

(10) Patent No.: US 9,289,868 B2
(45) Date of Patent: Mar. 22, 2016

(54) ADJUSTABLE ANGLE WORKPIECE POSITIONING DISC

(76) Inventors: Scott J. Gray, Brooksville, FL (US); David D. Emmendorfer, Clearwater, FL (US)

( * ) Notice: Subject to any disclaimer, the term of this patent is extended or adjusted under 35 U.S.C. 154(b) by 527 days.

(21) Appl. No.: 13/455,048

(22) Filed: Apr. 24, 2012

(65) Prior Publication Data

US 2013/0277904 A1    Oct. 24, 2013

(51) Int. Cl.
*B23Q 3/00* (2006.01)
*B23Q 3/04* (2006.01)

(52) U.S. Cl.
CPC ........................................ *B23Q 3/04* (2013.01)

(58) Field of Classification Search
CPC ................................. B23Q 16/28; B23Q 3/18
USPC ........ 269/302, 900, 57, 59, 208; 33/569, 537, 33/568, 570, 538; 74/815
See application file for complete search history.

(56) References Cited

U.S. PATENT DOCUMENTS

| | | | | |
|---|---|---|---|---|
| 167,618 | A * | 9/1875 | Mulberry | 269/63 |
| 1,343,751 | A * | 6/1920 | Simmons | 335/287 |
| 2,357,329 | A * | 9/1944 | Hansen | 74/815 |
| 2,365,436 | A | 12/1944 | Saucier | |
| 2,385,396 | A * | 9/1945 | Baum | 33/570 |
| 2,567,936 | A * | 9/1951 | Hansen | 74/813 R |
| 2,967,439 | A * | 1/1961 | Cole | 74/815 |
| 3,046,006 | A | 7/1962 | Kulicke, Jr. | |
| 3,165,840 | A * | 1/1965 | Woditsch | 33/569 |
| 3,175,820 | A * | 3/1965 | Schiler | 269/296 |
| 3,298,681 | A * | 1/1967 | Youngblood | 269/69 |
| 4,164,076 | A * | 8/1979 | Carrigan | 33/644 |
| 4,205,834 | A * | 6/1980 | Demuth et al. | 269/258 |
| 4,286,778 | A * | 9/1981 | Follmeyer | 269/91 |
| 4,496,165 | A * | 1/1985 | Schrekeis et al. | 279/46.6 |
| 4,819,386 | A * | 4/1989 | Struyf | 451/28 |
| 4,961,268 | A * | 10/1990 | Xu et al. | 33/568 |
| 5,320,007 | A * | 6/1994 | Weirauch | 82/1.11 |
| 5,419,540 | A | 5/1995 | Teafatiller | |
| 5,671,915 | A * | 9/1997 | Williams | 269/231 |
| 6,032,940 | A | 3/2000 | Wolfe | |
| 6,092,796 | A | 7/2000 | Long et al. | |
| 6,170,813 | B1 | 1/2001 | Bowers | |
| 6,279,888 | B1 * | 8/2001 | Wal, III | 269/37 |
| 6,601,839 | B1 | 8/2003 | Collins | |
| 6,637,737 | B1 | 10/2003 | Beecherl et al. | |
| 6,692,701 | B2 * | 2/2004 | Cleveland | 506/40 |
| 6,783,123 | B2 | 8/2004 | Guimont et al. | |
| 6,957,809 | B1 | 10/2005 | Ferrara et al. | |
| 7,094,012 | B1 | 8/2006 | Bang et al. | |
| 7,753,350 | B2 | 7/2010 | Barziza | |
| 8,087,651 | B2 * | 1/2012 | Dahlquist | 269/309 |
| 2002/0050673 | A1 | 5/2002 | Collins | |
| 2008/0315476 | A1 | 12/2008 | Akhavan-Malayeri | |

* cited by examiner

*Primary Examiner* — Joseph J Hail
*Assistant Examiner* — Henry Hong
(74) *Attorney, Agent, or Firm* — Maxey Law Office, PLLC; Stephen Lewellyn (57) ABSTRACT

An adjustable angle workpiece positioning disc includes a partial quarter section defining confronting and intersecting surfaces that form an orthogonal angle therebetween. A central through hole located at the center of the disc. Disc coordinate axes originated at the center of the central through hole. Pluralities of angle through holes are arrayed about the central through hole. The disc is mountable to the plate by doweling the central through hole with a dowel pin receiving hole and by doweling one angle through hole with a dowel pin receiving hole in accordance with a desired revolved angle between the disc coordinate axes and the plate coordinate axes.

5 Claims, 8 Drawing Sheets

ADJUSTABLE ANGLE WORKPIECE POSITIONING DISC

FIELD OF THE INVENTION

The present invention relates generally to fixtures used in the positioning of a workpiece to be machined, and more particularly, relating to a fixture for use with a jig or vice including a surface having a plurality of dowel holes and which is capable of setting one or more workpiece support surfaces at a desired angle for machining the workpiece.

BACKGROUND OF THE INVENTION

In the machining of a workpiece, it is customary to secure or setup the workpiece in a jig or other related device, such as a vice, for the purpose of positioning the workpiece in space relative to the machine tool that is to operate upon the workpiece during machining thereof. Known devices such as parallels, sine-bars, v-blocks, etc. are customarily used to aid in the setup of the workpiece. Angular positioning of a workpiece is particularly problematic, and while the devices heretofore meet their respective objectives and requirements, they tend to be of a complex construction, clumsy to operate and/or suffer in regard to reliability and repeatability in workpiece setup.

Accordingly, there is a need for a new fixture for use in the angular positioning of a workpiece in a workpiece securing jig, and more specifically, in a vice that is of a simple construction, easy to operate and which provides reliable and repeatable workpiece setup.

SUMMARY OF THE INVENTION

The embodiments of the present invention addresses this need by providing one or more adjustable angle workpiece positioning discs for use in connection with a mounting surface, such as a vice jaw that includes a plurality of dowel pin receiving holes.

Embodiments of the present invention also provide an adjustable angle workpiece positioning disc that is of non-complex construction and is simple to operate.

Embodiments of the present invention further provide an adjustable angle workpiece positioning device that is capable of setting a workpiece at a desired angle by utilizing dowel pins.

Embodiments of the present invention further provide an adjustable angle workpiece positioning disc that provides repeatable and reliable workpiece setup.

To achieve these and other advantages, in general, in one aspect, an adjustable angle workpiece positioning disc for use in connection with a plate surface comprising dowel pin receiving holes and plate coordinate axes, is provided. The disc includes a partial quarter section defining confronting and intersecting surfaces that form an orthogonal angle therebetween. A central through hole located at the center of the disc. Disc coordinate axes originated at the center of the central through hole. Pluralities of angle through holes are arrayed about the central through hole. The disc is mountable to the plate by doweling the central through hole with a dowel pin receiving hole and by doweling one angle through hole with a dowel pin receiving hole in accordance with a desired revolved angle between the disc coordinate axes and the plate coordinate axes, and wherein each of the plurality of angle through holes corresponds to a specific revolved angle between the disc coordinate axes and the plate coordinate axes.

In general, in another aspect, one of the angle through holes is centered on one plate coordinate axis, and wherein another of the angle through holes is centered on the other plate coordinate axis.

In general, in another aspect, the disc coordinate axes divides the disc into four equal quadrants, and the orthogonal circle section is disposed in the first quadrant, the one angle through hole is disposed in the fourth quadrant, and wherein the other angle through hole is disposed in the second quadrant.

In general, in another aspect, the orthogonal circle section is revolved zero degrees relative to the plate coordinate axes.

In general, in yet another aspect, the orthogonal circle section is revolved one or more degrees relative to the plate coordinate axes.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

As a preliminary matter, it should be noted that in this document (including the claims) directional terms, such as "above", "below", "upper", "lower", etc., are used for convenience in referring to the accompanying drawings. Additionally, it is to be understood that the various embodiments of the invention described herein may be utilized in various orientations, such as inclined, inverted, horizontal, vertical, etc., without departing from the principles of the invention.

Figure 1:
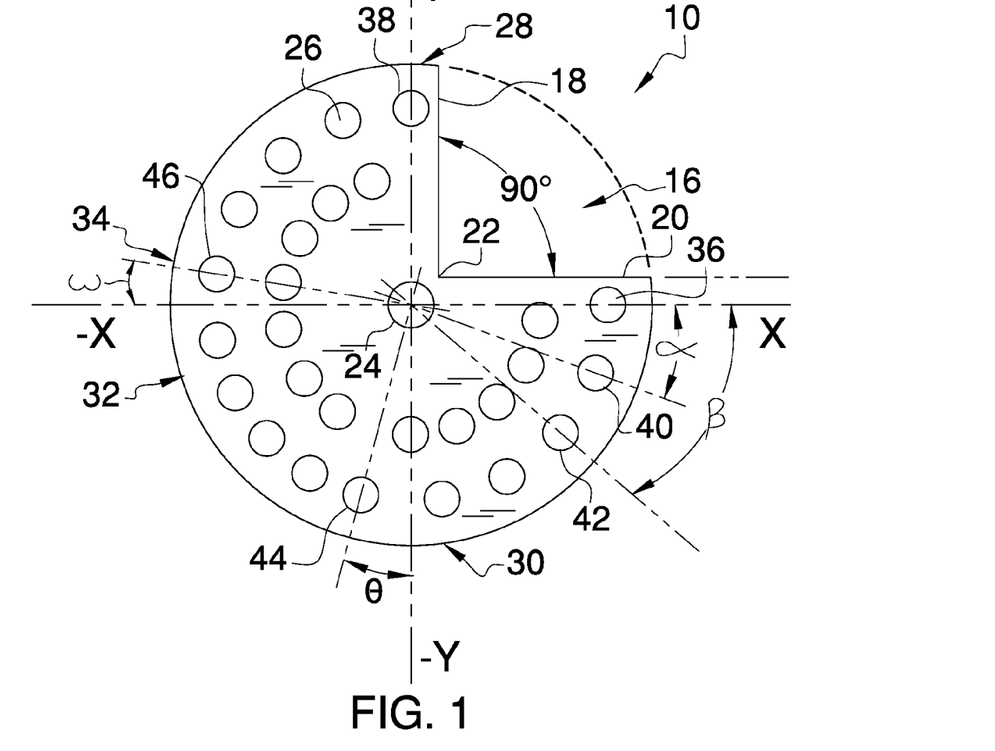
FIG. 1 is a diagrammatic front elevation view of an embodiment of an adjustable angle workpiece positioning disc constructed in accordance with the principles of the present invention.
Figure 2:
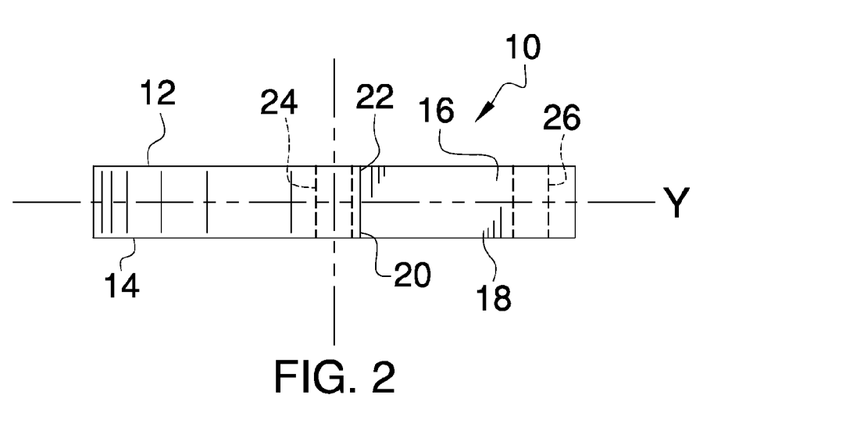
FIG. 2 is a diagrammatic side elevation view of the adjustable angle workpiece positioning disc of FIG. 1.

With reference to FIGS. 1 and 2, this invention provides a specially designed adjustable angle workpiece positioning disc 10 which is used in connection with a workpiece support plate (not shown here) to support and angularly position a workpiece in space relative to the workpiece support plate.

Disc 10 includes parallel first and second faces 12 and 14 in a spaced relation equal to the thickness of the disc. The first and second faces are substantially flat across the entire surface, with the possible exception of engraved or printed markings or indicia made on either surface. However, it is understood such engraved or printed markings are customarily used to mark machine tools and do not alter the substantially flat nature of the surface.

Disc 10 further includes a partial quarter section 16 which defines confronting surfaces 18 and 20 which extend between and normal to the first and second faces 12 and 14 of the disc 10. Surfaces 18 and 20 intersect each other, and at their intersection, form intersection edge 22. Intersection edge 22 extends between and normal to the first and second faces 12 and 14. As will be further described below, surfaces 18 and 20, depending upon disc orientation, serve as a workpiece support parallel and a workpiece support stop upon which a workpiece is positioned and at least partially supported during workpiece setup and/or machining of the workpiece.

Still referring to FIGS. 1 and 2, disc 10 further includes a central through-hole 24 that extends through the disc 10 normal to sides 12 and 14, thereof. The central through-hole 24 is located at the center of the disc 10. A plurality of positioning through-holes 26 are arrayed about the central through-hole 24, and extend through the disc 10 normal to sides 12 and 14. Through-holes 24 and 26 are smooth bore holes adapted for the reception of similarly sized dowel pins (not shown here) for the purpose of mounting the disc to the aforementioned workpiece support plate, which will be described in further detail below.

With reference to FIG. 1, disc 10 further includes a coordinate axis system (plate coordinate axes) comprising axis X and axis Y originating at the center of the central through-hole 24. The plate coordinate axes divide the disc 10 into four equally sized quadrants 28-34. As further depicted, one through-hole 36 of the positioning through-holes 26 is centered on axis X, and another through-hole 38 of the positioning through-holes is centered on axis Y. Accordingly, there is a zero-degree angle between through-hole 36 and axis X, and there is a zero-degree angle between through-hole 38 and axis Y.

This orthogonal relationship between through-holes 24, 36 and 38 serves a basis to which through-holes 26 and the quarter section 16 including surfaces 18 and 20 may be referenced. With particular reference to surfaces 18 and 20 of the quarter section 16, and in this embodiment, surface 18 is parallel to axis Y and perpendicular to axis X. Similarly, and because surfaces 18 and 20 are orthogonal, surface 20 is parallel to axis X and perpendicular to axis Y.

The position of each through-hole 26 may be referenced by its respective radian with respect to a reference axis. In this manner, each through-hole 26 disposed within the second quarter section 30 is referenced relative to axis X, each through-hole 26 disposed within the third quarter section 32 is referenced relative to axis −Y, and each through-hole 26 disposed within the fourth quarter section 34 is referenced relative to axis −X.

For example, through-hole 40, disposed in the second quarter section 30, has a radian equal to angle α as referenced to axis X, and through-hole 42 has a radian equal to β as referenced to axis X. Through hole 44, disposed in the third quarter section 32, has a radian equal to angle θ as referenced to axis −X. Through hole 46, disposed in the fourth quarter section 34, has a radian equal to ω as referenced to axis −Y. The remaining through-holes 26 in each quarter section may be referenced in the same manner as discussed above with respect to the exemplary referenced through-holes.

Figure 3:
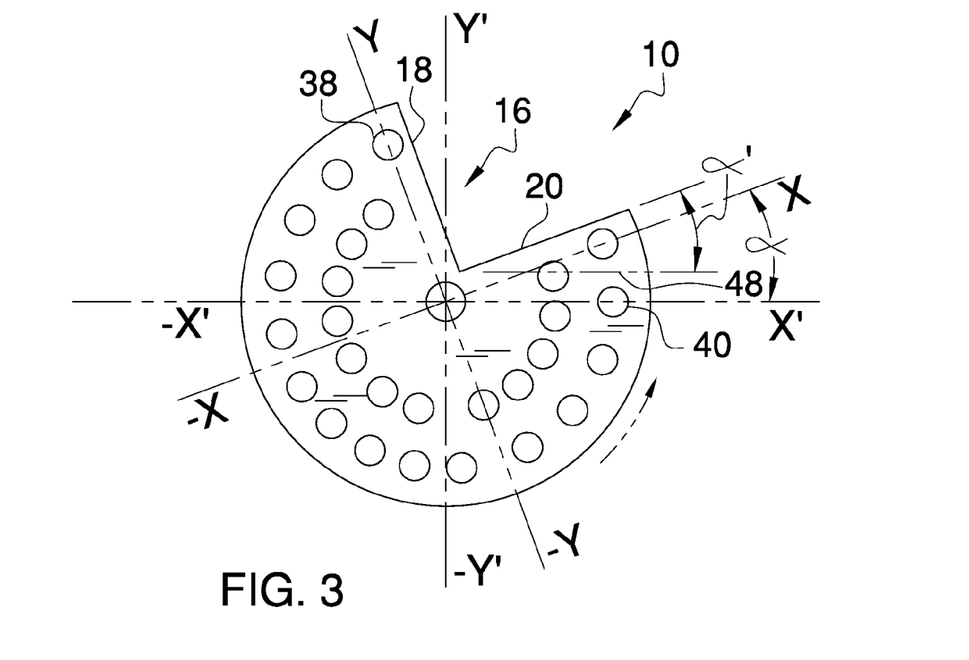
FIG. 3 is a schematic diagram of the adjustable angle workpiece positioning disc of FIG. 1, illustrating the disc positioned and revolved about a global coordinate axis system an angular rotation equal to a radian of an angle through-hole of the disc.

With reference to FIG. 3, the specific relationship of center through-hole 24, angle through-holes 26 and surfaces 20 and 18 of the quarter section 16 is illustrated and will described. As seen here, the plate coordinate axis system comprising axes X and Y is super imposed upon a global axis system comprising axes X' and Y', and then the disc 10 is revolved in a direction counter-clockwise about the center of the center through-hole 24, and thus about the origin of the global axis system an angular rotation equal to radian α of through-hole 40, thereby position the radian of through-hole 40 along the X' axis. The significance of this relation is found with reference to surface 20 of the removed quarter section 16. Specifically, surface 20 has also been revolved in space equal to radian angle α as indicated by angle α' taken between the non-revolved position of surface 20, indicated by broken line 48, and the revolved position of surface 20, shown in solid line. To this end, the revolved angular position of surface 20 is directly correlated to the radian of the through-holes 26 relative to its respective referenced coordinate axis as revolved about the global coordinate axis system.

Figure 4:
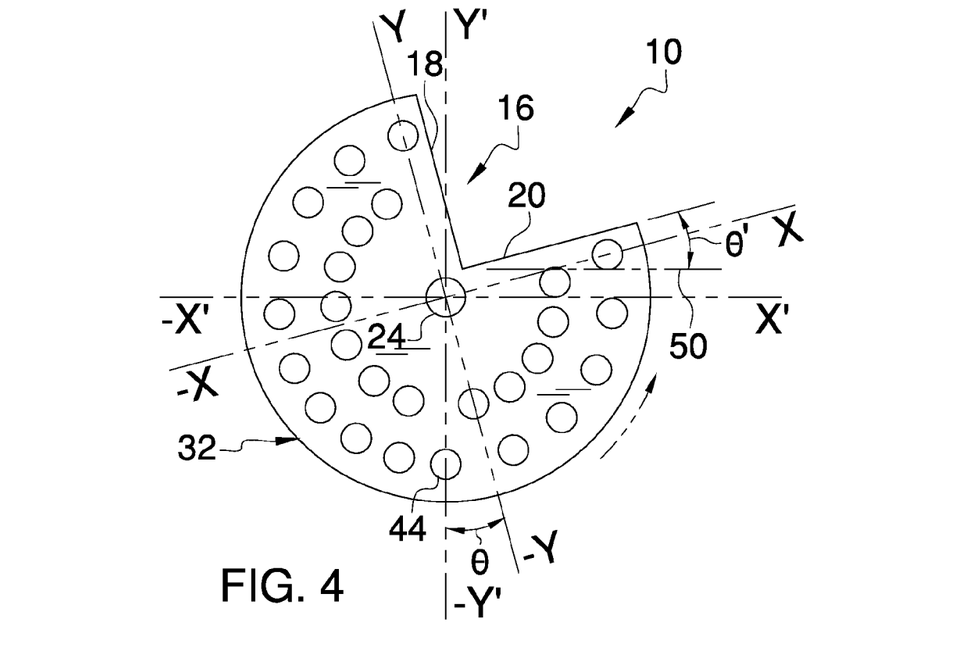
FIG. 4 is a schematic diagram of the adjustable angle workpiece positioning disc of FIG. 1, illustrating the disc positioned and revolved about a global coordinate axis system an angular rotation equal to a radian of another angle through-hole of the disc.

With reference to FIG. 4, a second illustrative example of disc 10 revolved about the globe coordinate axis system is shown. In this illustrative example, disc 10 is again revolved in a counter-clockwise direction about the center of center through-hole 24 such that radian θ of through-hole 44, of the third quarter section 32, is position along global coordinate axis −Y'. As shown, surface 20 is also revolved in space equal to radian angle θ as indicated by angle θ' taken between the non-revolved position of surface 20, indicated by broken line 50, and the revolved position of surface 20, shown in solid line.

Figure 5:
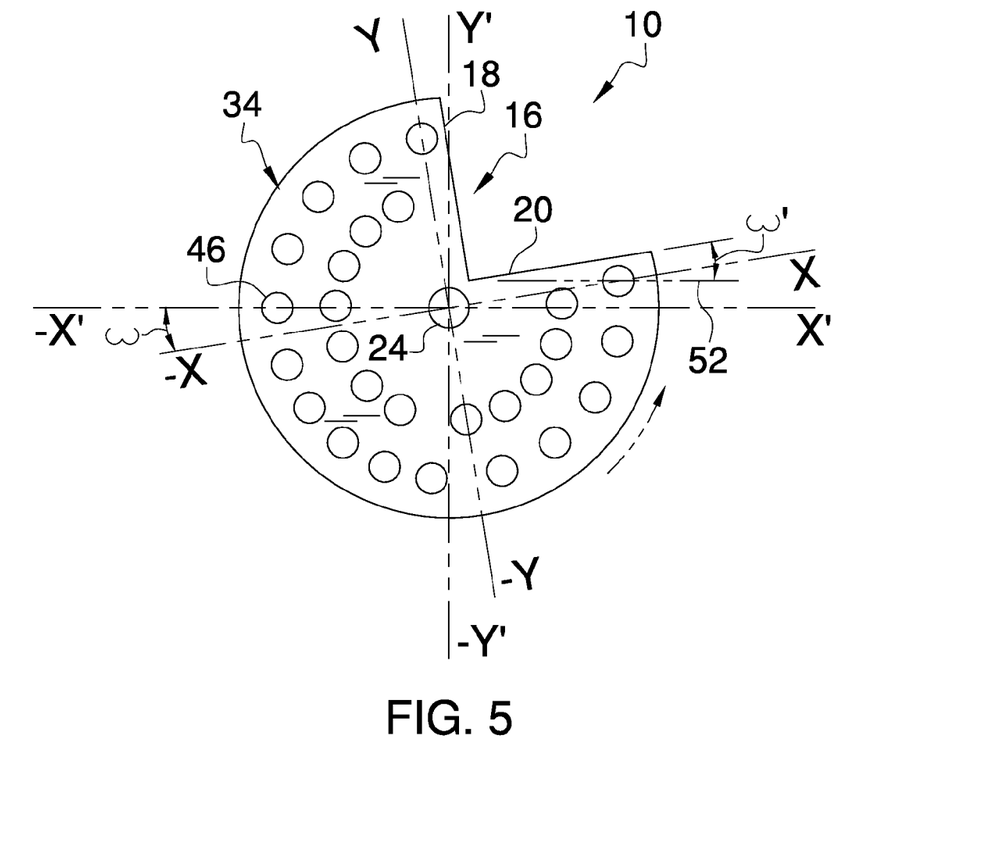
FIG. 5 is a schematic diagram of the adjustable angle workpiece positioning disc of FIG. 1, illustrating the disc positioned and revolved about a global coordinate axis system an angular rotation equal to a radian of another angle through-hole of the disc.

With reference to FIG. 5, a third illustrative example of the disc 10 revolved about the globe coordinate axis system is shown. In this illustrative example, disc 10 is again revolved in a counter-clockwise direction about the center of center through-hole 24 such that radian ω of through-hole 46, of the third quarter section 34, is position along global coordinate axis −X'. As shown, surface 20 is also revolved in space equal to radian angle ω as indicated by angle ω' taken between the non-revolved position of surface 20, indicated by broken line 52, and the revolved position of surface 20, shown in solid line.

Figure 6:
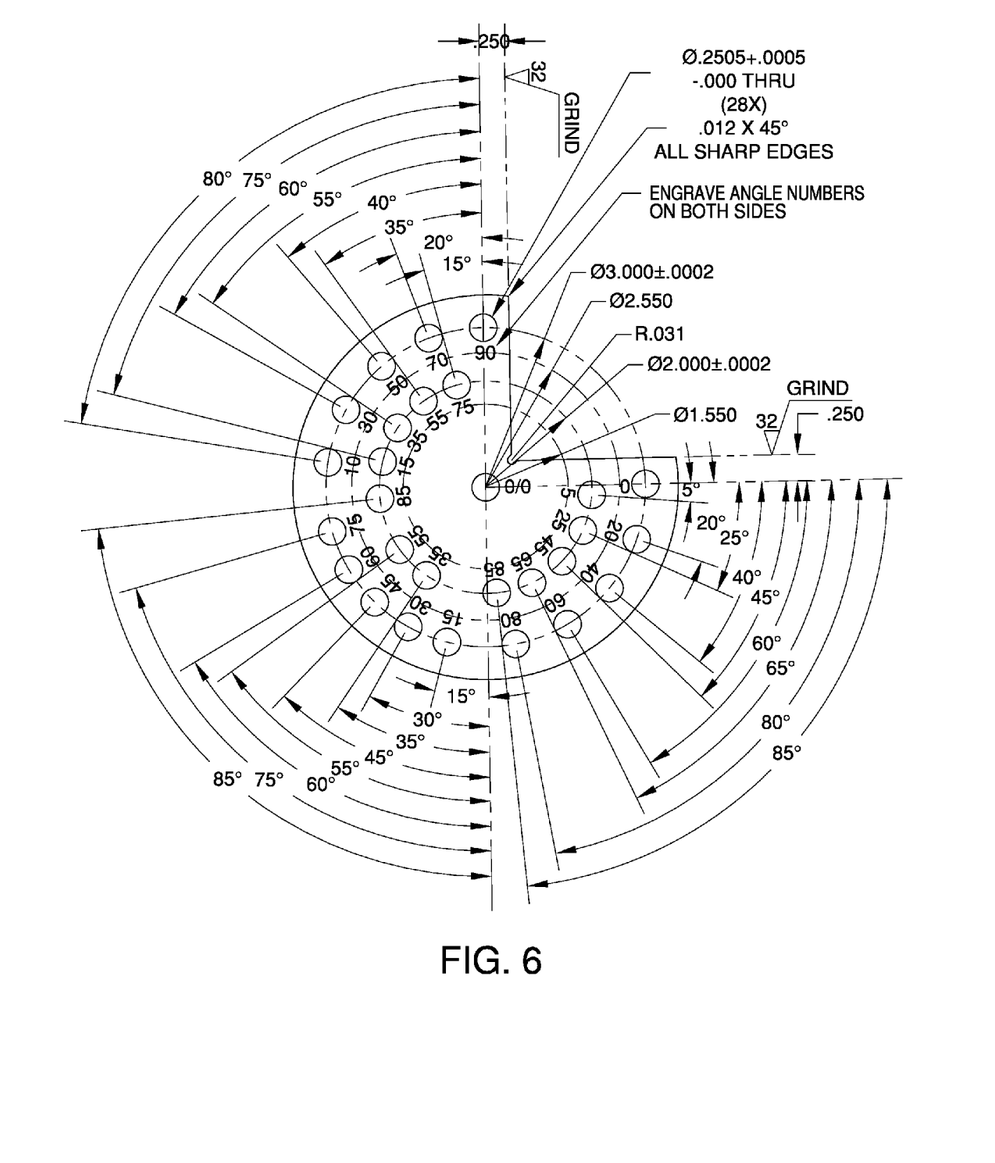
FIG. 6 is a diagrammatic front elevation view of an embodiment of the adjustable angle workpiece positioning disc, illustrating the radians of the angle through-holes of the disc in accordance with at least one embodiment of the invention.

With respect to the illustrative examples depicted in FIGS. 3 through 5, and discussed above, it becomes readily apparent that the angular position of surface 20, and also surface 18, may be adjusted according to the positioning of the radian of a specific through-hole 26 in the global coordinate axis system. In FIG. 6, there is illustrated a disc 10 having an exemplary array of through-holes 26 and their each respective radian degree.

Figure 7:
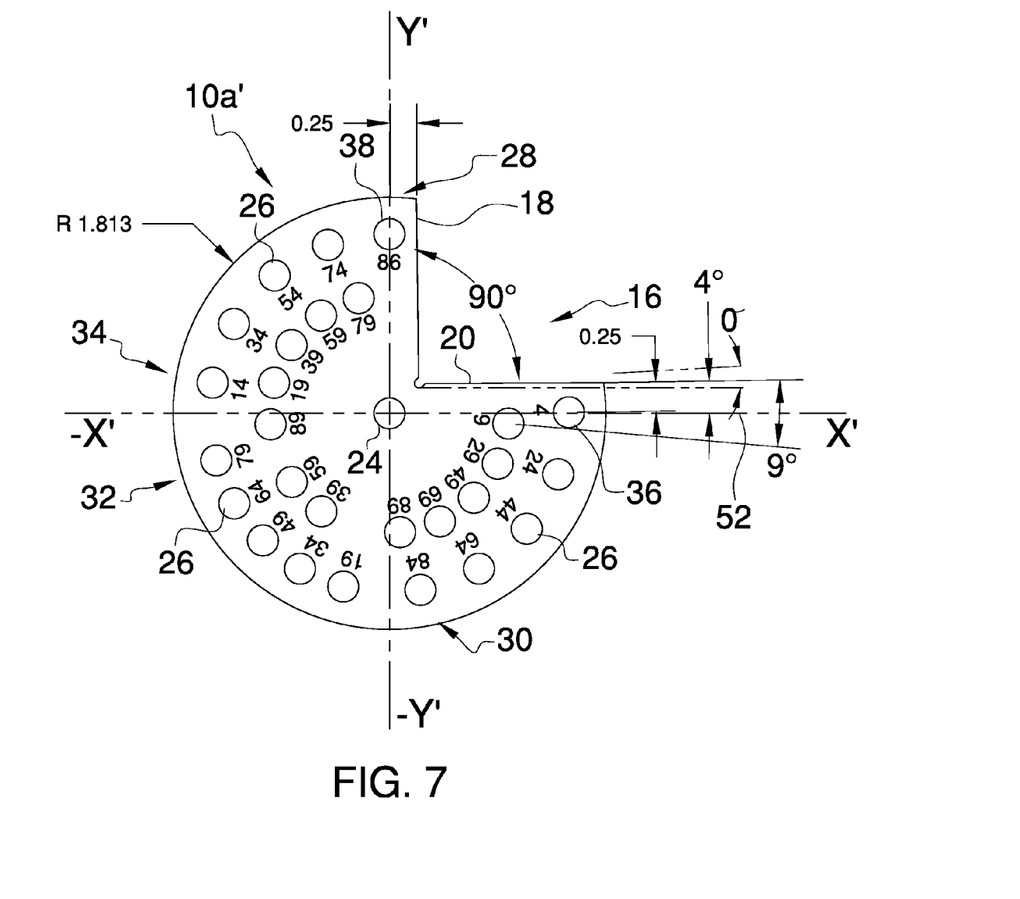
FIG. 7 is a diagrammatic front elevation view of an alternative embodiment of the adjustable angle workpiece positioning disc.

With reference to FIG. 7, an alternative embodiment 10a of the previously described disc 10 is illustrated. Here, the removed partial quarter section 16 is rotated relative to the plate coordinate axis system, such that surfaces 18 and 20 form an angle greater than zero with the coordinate axes, whereas in the previously described disc 10, surfaces 18 and 20 where parallel with the coordinate axes. The rotation of the quarter section 16 is referenced with the original (non-rotated) position of surface 18 of disc 10 as indicated by broken line 52 and the rotated position of surface 18 (shown in solid) line by angle σ. To this end, the position of through-holes 26 relative between disc 10 and disc 10a remain unchanged. However, the angular position or positioning of surface 20 is now a function of the radian of the specific through-hole 26 and angle σ. For example, in this embodiment, angle σ is equal to 4.0-degrees; accordingly, the angular position of surface 20 is equal to the sum of the through-hole radian and angle σ. To this end, a variety of discs 10a may be provided with different angle's σ for the purpose of providing users with varied possible angle setups of a workpiece positioned and supported by surfaces 18 and 20. In embodiments, sets of discs 10 and 10a may be provided for user selection in the setup of a workpiece.

Figure 8:
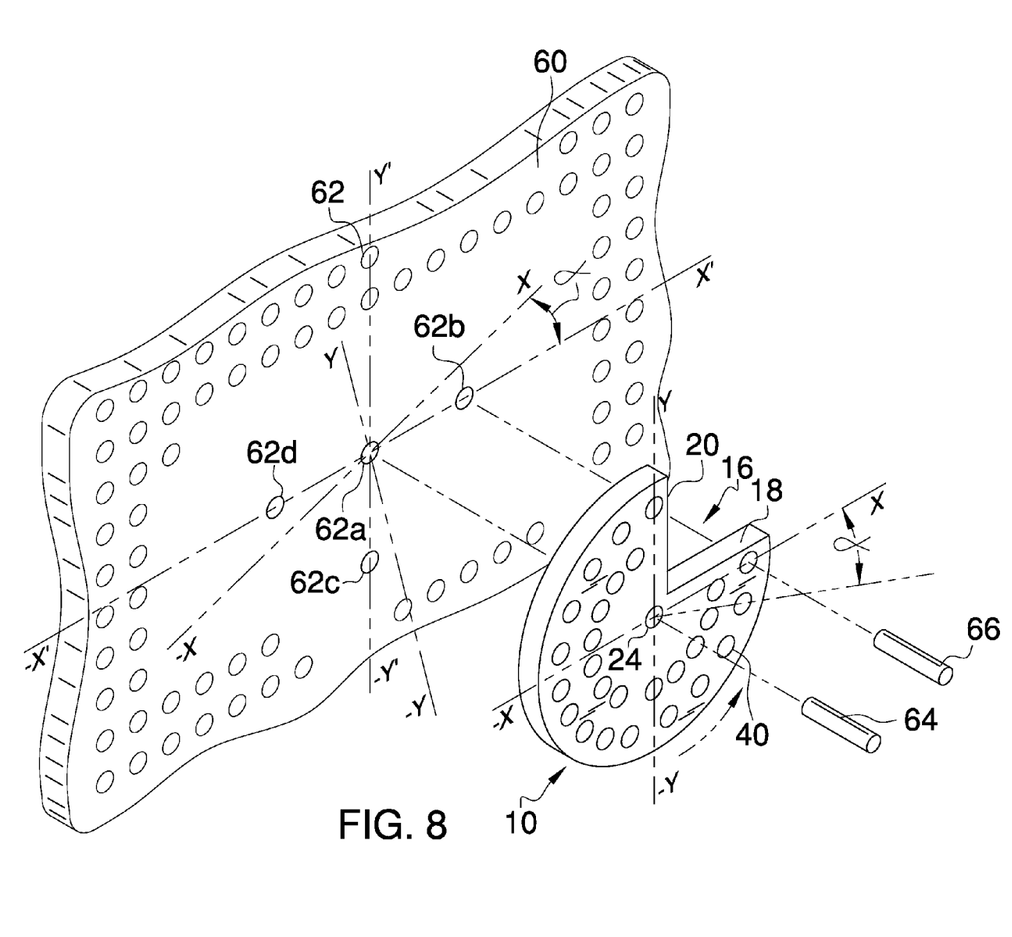
FIG. 8 is a diagrammatic perspective view of an embodiment of the adjustable angle workpiece positioning disc and a mounting surface to which the disc is mountable for the purpose of positioning and workpiece.

Turning now to FIG. 8, there is illustrated a diagrammatic exploded perspective view of disc 10 and a surface 60, such as a vice jaw, to which the disc is mountable for use in the positioning and supporting a workpiece to be machined. Surface 60 is provided with a grid pattern of dowel receiving holes 62 including holes 62a, 62b, 62c and 62d. Only a limited number of holes 62 are shown for the purpose of illustrative clarity. As illustrated, global coordinate axis system comprising axes X' and Y' are positioned on surface 60 with its origin centered at the center of hole 62a, and thus providing a plate coordinate axis system with origin at hole 62a. Holes 62b and 62d are positioned along axis X' and hole 62c is positioned along axis Y'.

In the illustrative example, disc 10 is mounted to surface 60 by doweling dowel pin 64 through the center through-hole 24 of the disc 10 and hole 62a of surface 60, thereby originating the disc coordinate axis system with the plate coordinate axis system. In this manner, disc 10 may be revolved upon dowel pin 64 in a plane parallel to surface 60 to position and align a through-hole 26 with holes 62b, 62c or 62d in accordance with the desired angle of surface 18 and further in accordance with the above discussion. That is, and for example, disc 10 may be rotated to align through-hole 40 with hole 62b where the disc may then be secured from further rotation by doweling dowel pin 66 through hole 62b and through-hole 40, thereby securing the disc 10 about a revolved angle equal to angle of radian α as projected onto surface 60. To this end, disc 10 is securely mounted to surface 60 with surface 20 also positioned at an angle equal to α, whereby a workpiece may be positioned along surface 20 and/or 18.

Figure 9:
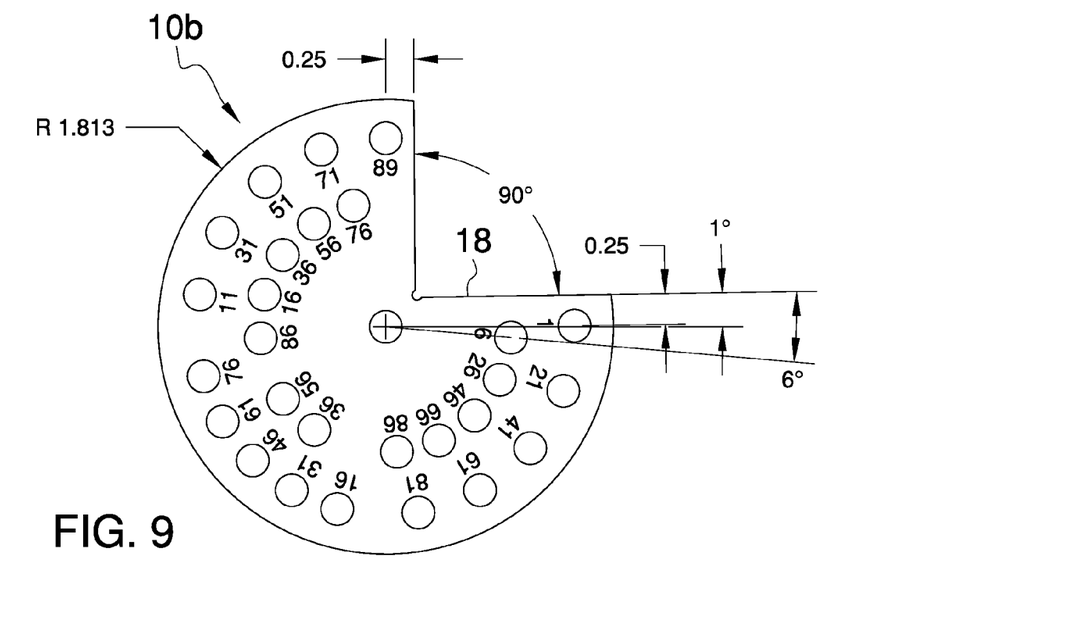
FIG. 9 is a diagrammatic front elevation view of an alternative embodiment of the adjustable angle workpiece positioning disc.
Figure 10:
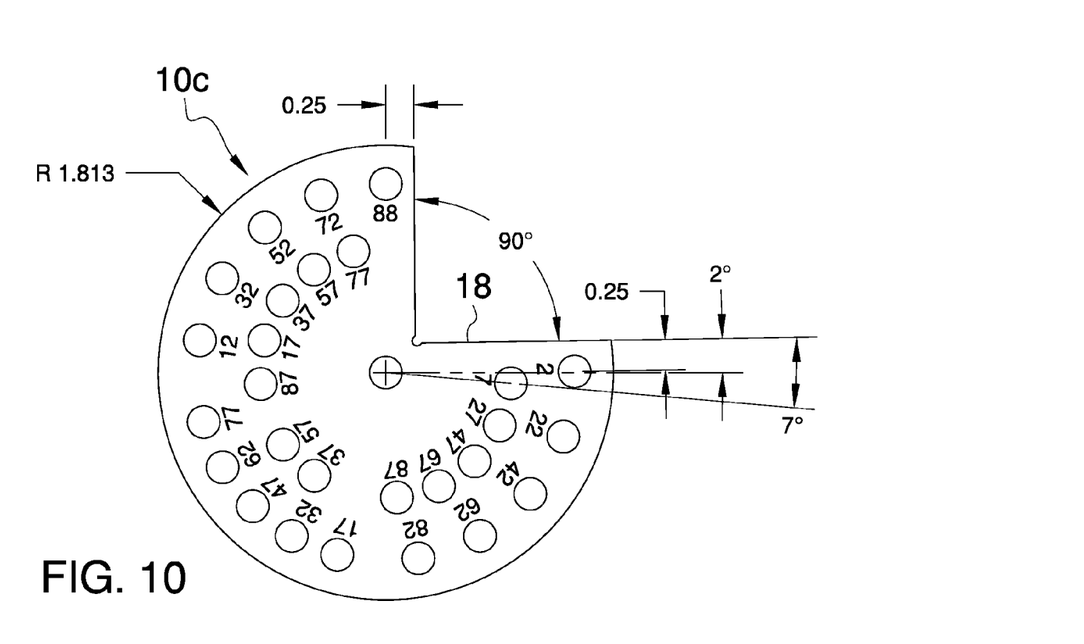
FIG. 10 is a diagrammatic front elevation view of an alternative embodiment of the adjustable angle workpiece positioning disc.
Figure 11:
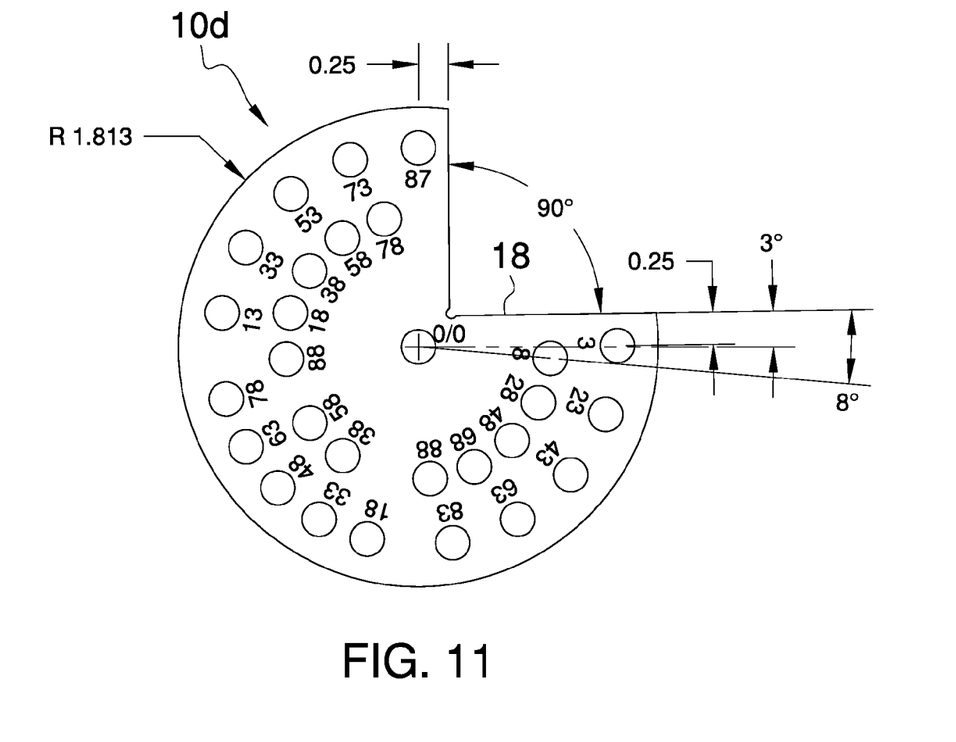
FIG. 11 is a diagrammatic front elevation view of an alternative embodiment of the adjustable angle workpiece positioning disc.

In FIGS. 9 through 11, there are illustrated alternative embodiments 10b, 10c, and 10d, respectively, of previously described discs 10 and 10a. Embodiment 10b is illustrative of surface 18 having a one-degree rotation. Embodiment 10c is illustrative of surface 18 having a two-degree rotation. And, embodiment 10d is illustrative of surface 18 having a three-degree rotation. Of course, surface 18 may have other rotations that are not illustrated in the drawings herein and which would still remain within the scope of the invention.

A number of embodiments of the present invention have been described. Nevertheless, it will be understood that various modifications may be made without departing from the spirit and scope of the invention. Accordingly, other embodiments are within the scope of the following claims.

What is claimed is:

1. An adjustable angle workpiece positioning disc for use in connection with a plate surface comprising dowel pin receiving holes and global coordinate axes, the disc comprising:
   a partial quarter section defining first and second confronting surfaces that intersect one another at an intersection edge, said first and second confronting surfaces forming an orthogonal angle therebetween;
   a central through hole located at the center of said disc;
   disc coordinate axes originated at the center of said central through hole;
   a plurality of angle through holes arrayed about said central through hole and grouped into separate groups of angle through holes;
   wherein each angle through hole of a common group of angle through holes corresponds to a revolved angle relative to said disc coordinate axes that is different from the angle of any other through hole of the common group;
   wherein said disc coordinate axes divides said disc into four quadrants, and said partial quarter section is disposed in the first quadrant, said one angle through hole is disposed in said fourth quadrant, and wherein said other angle through hole is disposed in said second quadrant; and wherein said partial quarter section is revolved zero degrees relative to said disc coordinate axes.

2. The disc of claim 1, wherein said partial quarter section is revolved one or more degrees relative to said disc coordinate axes.

3. The disc of claim 1, wherein said partial quarter section is revolved zero degrees relative to said disc coordinate axes.

4. The disc of claim 1, wherein said partial quarter section is revolved one or more degrees relative to said disc coordinate axes.

5. The disc of claim 1, wherein only one of said angle through holes is centered on one disc coordinate axis, and wherein only one other of said angle through holes is centered on the other disc coordinate axis.

* * * * *